United States Patent
McFarland

(10) Patent No.: US 7,379,390 B2
(45) Date of Patent: May 27, 2008

(54) DISTANCE MEASUREMENT FOR WIRELESS BUILDING AUTOMATION DEVICES

(75) Inventor: Norman R. McFarland, Palatine, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 11/650,031

(22) Filed: Jan. 5, 2007

(65) Prior Publication Data

US 2007/0109914 A1    May 17, 2007

Related U.S. Application Data

(62) Division of application No. 10/937,078, filed on Sep. 9, 2004.

(51) Int. Cl.
*G01S 3/80* (2006.01)
*G05B 13/00* (2006.01)

(52) U.S. Cl. .................................. 367/128; 700/275

(58) Field of Classification Search ................. 367/127, 367/128; 700/275, 276, 277
See application file for complete search history.

(56) References Cited

U.S. PATENT DOCUMENTS

| | | | |
|---|---|---|---|
| 5,953,368 A | 9/1999 | Sanderford et al. | |
| 5,987,058 A | 11/1999 | Sanderford et al. | |
| 6,078,269 A | 6/2000 | Markwell et al. | |
| 6,404,703 B1 * | 6/2002 | Burrell | 367/128 |
| 6,560,462 B1 | 5/2003 | Ravi et al. | |
| 6,700,533 B1 | 3/2004 | Werb et al. | |
| 6,735,630 B1 | 5/2004 | Gelvin et al. | |
| 2002/0006788 A1 | 1/2002 | Knutsson et al. | |
| 2002/0042274 A1 | 4/2002 | Ades | |
| 2002/0143935 A1 | 10/2002 | Schenkel et al. | |
| 2003/0007473 A1 | 1/2003 | Strong et al. | |
| 2003/0012168 A1 | 1/2003 | Elson et al. | |
| 2003/0020595 A1 | 1/2003 | Wacyk | |
| 2003/0051032 A1 | 3/2003 | Schenkel et al. | |
| 2003/0122677 A1 | 7/2003 | Kail, IV | |
| 2003/0142587 A1 * | 7/2003 | Zeitzew | 367/127 |
| 2003/0206115 A1 | 11/2003 | Krumm et al. | |
| 2004/0100394 A1 | 5/2004 | Hitt | |
| 2004/0104841 A1 | 6/2004 | Syrjarinne | |
| 2005/0278070 A1 * | 12/2005 | Bash et al. | 700/276 |
| 2005/0289467 A1 | 12/2005 | Imhof et al. | |
| 2006/0028997 A1 | 2/2006 | McFarland | |

* cited by examiner

*Primary Examiner*—Ian J Lobo

(57) ABSTRACT

In a building environment, a distance associated with a building automation device is determined as a function of an inserted time delay between a wireless transmission of a signal and wireless reception of another signal. For example, a two-way communication is provided with a time delay inserted before responding to a received transmission. By using two-way transmissions, the building automation devices may be free of clock synchronization. Acoustic signals may be used in a building environment to determine a distance. The building automation device may also use radio frequency information for communicating with other devices. Communication between devices allows a controller to coordinate the determination of distances associated with different devices within a network, such as through transmission of a test signal and assigning distance measurement operations to devices that receive the test signal with sufficient strength or other characteristics.

3 Claims, 1 Drawing Sheet

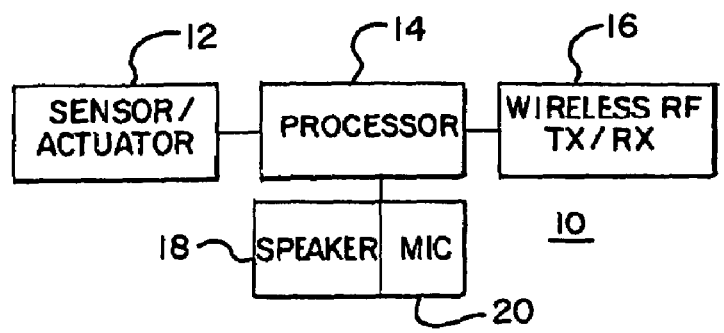
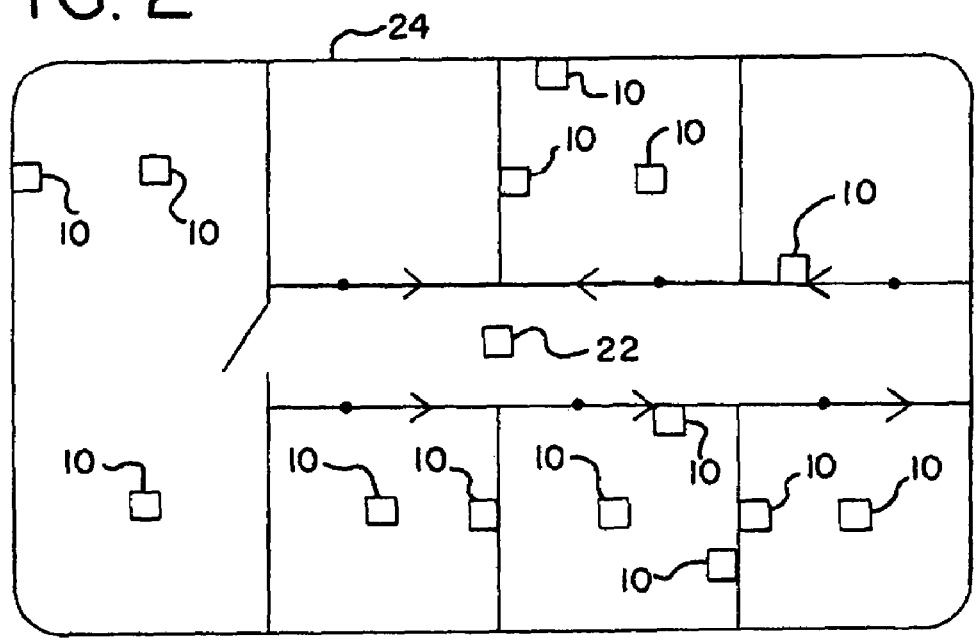
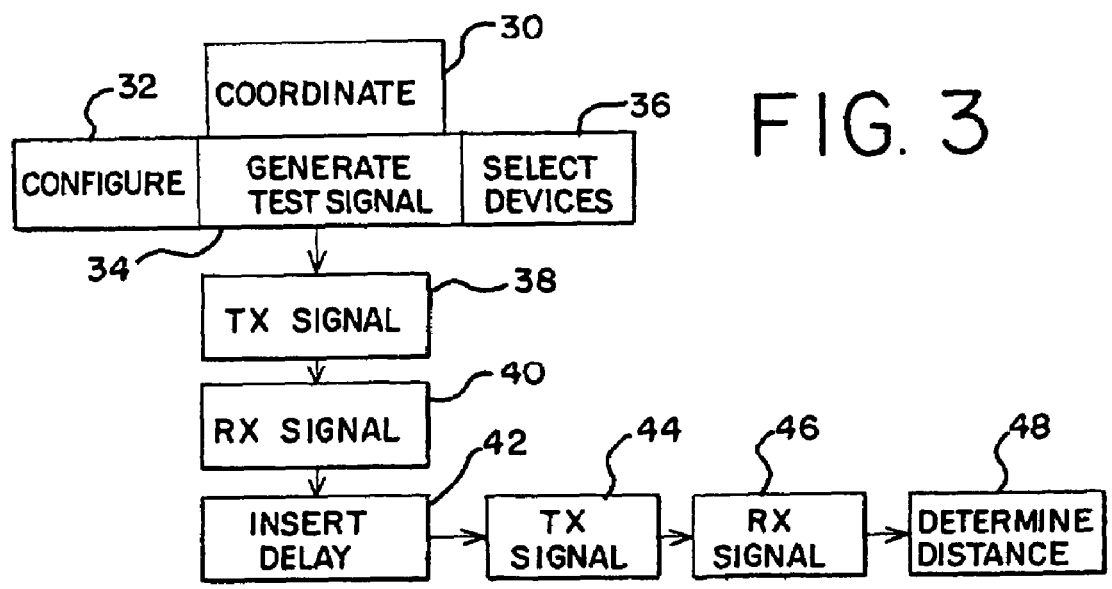

DISTANCE MEASUREMENT FOR WIRELESS BUILDING AUTOMATION DEVICES

RELATED APPLICATIONS

The present patent document is a divisional of application Ser. No. 10/937,078 filed Sep. 9, 2004. The foregoing application is hereby incorporated by reference.

BACKGROUND

The present invention relates to wireless building automation. In particular, distance measurement is provided for locating or determining a position of a wireless building automation device.

Building automation devices are positioned throughout a building. For example, a temperature sensor or thermostat is positioned on a wall in a room and a corresponding actuator is positioned above a ceiling for controlling airflow, heating or cooling. As another example, a motion sensor is positioned on a ceiling for actuating a light controlled by a ballast balance above the ceiling. Security, fire, heating, ventilation, air conditioning (HVAC) or other networks of devices automate building control. The relative positions of different devices or the relative positions of devices with respect to the layout of a building or rooms may be used to better optimize the automation. To determine the different positions, a blueprint or map is generated of the automation system. The devices are located manually, and corresponding association tables between devices are created. Manual mapping may be inaccurate. When a device malfunctions, inaccurate mapping or no mapping makes locating a device difficult, particularly where the device is located out of site above a ceiling or in a wall. Adding visual indications identifying a location of an otherwise out of site device is unaesthetic. Manually locating devices for replacement may be time consuming and costly.

BRIEF SUMMARY

By way of introduction, the preferred embodiments described below include methods and systems for determining distances for building automation components. In a building environment, various features alone or in combination assist in distance determination. A distance associated with a building automation device is determined as a function of an inserted time delay between a wireless transmission of a signal and wireless reception of another signal. For example, a two-way communication is provided with a time delay inserted before responding to a received transmission. By using two-way transmissions, the building automation devices may be free of clock synchronization. Acoustic signals may be used in a building environment to determine a distance. The building automation device may also use radio frequency information for communicating with other devices. Communication between devices allows a controller to coordinate the determination of distances associated with different devices within a network, such as through transmission of a test signal and assigning distance measurement operations to devices that receive the test signal with sufficient strength or other characteristics.

In a first aspect, a method is provided for determining a distance for a building automation device. A first signal is wirelessly transmitted from a building automation device within a building. A second signal is wirelessly received at the building automation device within the building. A set time delay is inserted between the transmission and the reception. A distance associated with the building automation device is determined as a function of the set time delay and the time-of-flight of the transmitted and received signals.

In a second aspect, a system is provided for determining a distance for building automation components. Different building component devices have wireless transmitters, wireless receivers and processors. A processor of one component is operable to transmit a first signal. The receiver of another component is operable to receive the signal. The transmitter of the other component is operable to transmit a responsive signal. The processor of the other component is operable to insert a set time delay between reception of the first signal and transmission of the responsive signal. A receiver of the original device is operable to receive the responsive signal. A processor of the original device is operable to determine a distance between the two building automation devices as a function the set time delay and the time from transmission of the first signal to reception of the responsive signal.

In a third aspect, a method is provided for determining a distance for building automation device. An acoustic signal is transmitted from a speaker within a building. An acoustic signal is received with a microphone within the building. A distance from the speaker to the microphone is determined as a function of the acoustic signal.

In a fourth aspect, a building automation device is provided for determining distance after placement within a building. A sensor, an actuator or combinations thereof are operable for control of an environment of a building. A processor is operable to control an acoustic transceiver for distance determination in response to control signals from a radio frequency transceiver. The processor is operable to process data of the sensor, actuator or both.

In a fifth aspect, a system is provided for determining distances in a wireless building automation network. A plurality of spaced apart building automation devices are operable to wirelessly communicate with a controller. The controller is operable to cause one of the devices to transmit a test signal, assign one or more of the other devices to the transmitting device as a function of the reception by the other devices of the test ranging signal, and to cause distances from the transmitting device and the assigned devices to be determined.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

FIG. 1 is a block diagram of one embodiment of a building automation device;

FIG. 2 is a top plan view of one embodiment of a network of building automation devices; and FIG. 3 is a flow chart diagram of one embodiment of a method for determining a distance for building automation components.

DETAILED DESCRIPTION OF THE DRAWINGS AND PRESENTLY PREFERRED EMBODIMENTS

In building automation systems, the location or coordinate position of the various devices is determined using a distance measurement. By providing a plurality of different distance measurements from a predetermined or known reference point, the position or coordinate location may be triangulated. As a location of each device within a network of devices is identified, further locations of other devices relative to the now known location may be determined. In addition to or as an alternative to identifying a position or location in two- or three-dimensions, a distance may be used for determining a signal strength or other purposes.

Time-of-flight information of a wireless signal is used to identify a distance. Radio frequency, acoustic, combinations thereof or other types of signals are used. For example, a timing packet is transmitted using ultrasound energy. The packet is received at a different device. After waiting a particular interval, the different device transmits the packet or other information acoustically or using a radio frequency signal back to the source device. The source device measures the response time to obtain the distance.

FIGS. 1 and 2 show a system for determining a distance for building automation components. FIG. 1 shows a building automation device 10 used within the system. The building automation device includes a sensor or actuator 12, a processor 14, a wireless radio frequency transmitter or receiver 16, a speaker 18 and a microphone 20. Additional, different or fewer components may be provided. For example, the building automation device 10 is free of the speaker 18, the microphone 20, the speaker 18 and the microphone 20, the wireless transmitter or receiver 16, and/or the sensor or actuator 12. The building automation device 10 is a controller, actuator, sensor or other device in a security, fire, environment control, HVAC, lighting, or other building automation system. As a controller, the building automation device 10 may be free of the sensor or actuator 12. In one embodiment, the building automation device 10 includes a wired connection to one or other devices 10 within the network and is either free of or also includes the wireless radio frequency transmitter or receiver 16. In yet another embodiment, the building automation device is a wireless device free of communications or connections over wires to other remote devices. For example, the building automation device is any one of the building control system devices, processors or controllers disclosed in U.S. Pat. No. 11/650,031, the disclosure of which is incorporated herein by reference.

The sensor or actuator 12 is a single sensor, multiple sensors, single actuator, multiple actuators or combinations thereof. As a sensor, the sensor 12 is a temperature, humidity, fire, smoke, occupancy, air quality, gas, $CO_2$, CO, combinations thereof or other now known or later developed sensor. Micro-electromechanical or larger sensors may be provided for sensing any of various environmental conditions. As an actuator, the actuator 12 is a valve, relay, solenoid, speaker, bell, switch, motor, motor starter, damper, pneumatic device, combinations thereof or other now known or later developed actuating devices for building automation. For example, the actuator 12 is a valve for controlling flow of fluid or gas in a pipe. As another example, the actuator 12 is a relay or other electrical control for opening and closing doors, releasing locks, actuating lights, or starting and stopping motors. As yet another example, the actuator 12 is a solenoid to open or close a damper, such as for altering airflow.

Where the building automation device 10 is free of the sensor or actuator 12, the device 10 may be a controller. The controller is positioned at a known or unknown location. As a controller, the building automation device 10 interacts with other building automation devices 10 for configuring, coordinating, influencing, controlling, or performing other control or reporting functions.

The processor 14 is a general processor, digital signal processor, application-specific integrated circuit, field programmable gate array, analog circuit, digital circuit, network of processors, combinations thereof or other now known or later developed device for processing data and/or controlling operation of the building automation device 10. The processor 16 has a processing power or capability and associated memory corresponding to the desired operation of the device 10 or a class of devices, such as an eight or sixteen bit processor. By minimizing processor requirements and associated memory, the cost and power consumption of the device 10 may be reduced. Larger or smaller processors and associated memories may be used, such as a larger processor where the device 10 is operating as a controller.

The processor 14 is operable to cause transmission or reception actions by the wireless radio frequency transmitter or receiver 16, the speaker 18 or the microphone 20. For example, the processor 14 is operable to cause the acoustic speaker 18 to transmit an ultrasound signal. The processor 14 is also operable to cause the microphone 20 to receive an ultrasound signal and determine a distance from another device as a function of the received signal. Alternatively or additionally, the processor 14 is operable to cause the wireless radio frequency transmitter or receiver 16 to transmit data for determining the distance. Additionally or alternatively, the wireless radio frequency transmitter 16 transmits a determined distance or distances as well as data regarding the processes and operation of the sensor or actuator 12.

The wireless radio frequency transmitter and receiver 16 or the speaker 18 are alternate wireless transmitters operable to transmit a signal for distance determination. Similarly, the wireless radio frequency receiver 16 and microphone 20 are alternative wireless receivers operable to receive signals for distance determination.

The wireless radio frequency transmitter or receiver 16 is a transmitter, a receiver or a transceiver. The wireless radio frequency transceiver 16 operates pursuant to any of various now known or later developed communications protocols, such as IEEE 802 wireless communications protocols. The wireless radio frequency transceiver 16 is operable to transmit digital or analog information, such as a carrier wave modulated by digital signals. The wireless transceiver 16 transmits timing or other distance related information, such as a sinusoidal pulse. The wireless transceiver 16 is operable to receive timing or distance information, such as a transmitted pulse subjected to attenuation or other environmental alteration. Filters or other processes may be used to remove noise or other undesired information.

In an alternative or additional embodiment, the speaker 18 and microphone 20 are used for wirelessly transmitting and receiving information for determining a distance. The speaker 18 and microphone 20 are an acoustic transducer or transceiver. A piezoelectric ceramic or composite piezoelectric, a micro-electromechanical device, such as a flexible membrane or membranes, waveguide, or other now known or later developed speakers and microphones as separate devices or transceivers may be used. An array of acoustic transceivers is provided for directional processing, such as determining an angle for transmissions or receptions. An array may alternatively or additionally be used for generating a desired radiation pattern. Alternatively, a single acoustic transceiver is positioned on an outside of the device 10 to maximize the radiation pattern. The speaker 18 and microphone 20 are sized and shaped for operation at ultrasound frequencies, such as 20 KHz or higher. Frequencies in the megahertz range, such as 1 to 20 MHz, lower frequencies, or audible frequencies may be used.

The processor 14 is operable to control the acoustic transceiver for distance determination operation. For example, the processor 14 causes the acoustic transceiver 18, 20 to transmit an acoustic pulse, such as a sinusoidal, bipolar or unipolar pulse. Any of various pulse lengths may be used, such as single cycle or multiple cycle pulses. A desired transmit amplitude is provided, such as associated with transmitting the acoustic energy over a distance of 10-20 meters. The transmit amplitude may be adjustable. Depending on the building environment, such as an enclosed office building, the transmit amplitude may be set for reception by a likely plurality of other devices within a restricted space. The processor 14 is also operable to process received information, such as identifying a zero crossing, amplitude or other characteristic of received acoustic energy.

Where a wireless radio frequency transceiver 16 is provided with the speaker 18 and microphone 20, the wireless radio frequency transceiver 16 is used to control operation of the processor 14 and distance measurements using the acoustic transceiver 18, 20. Control signals are received wirelessly using the wireless radio frequency transceiver 16. The control signals coordinate distance determination among various devices or for a specific device. For example, the control signals indicate when and what type of a test signal or actual measurement signal is transmitted for distance determination. As another example, control signals from the wireless transceiver 16 instruct the processor 18 to act to receive or not act to receive acoustic transmission from one or other different devices. Control signals may be used to alter an insert time delay, set signal strength, select signal processing, establish communications protocol, provide the delay information, provide time-of-flight information or control another process.

The processor 14 is also operable to determine a distance between building automation devices 10 or the building automation device 10 and another device. The distance is determined by the same processor used for initiating the transmission of a signal, the processor that receives a first transmitted signal, or a processor remote from either of the devices that transmitted the distance signal or received the distance signal for determining time-of-flight. In one embodiment, the processor 14 uses time-of-flight information to determine the distance. A one-way time-of-flight associated with transmitting from one component and reception at another component may be used. Alternatively or additionally, a two-way time-of-flight is used where one component transmits a signal, another device receives the signal and responsively transmits another signal and the originating device receives the responsively transmitted signal.

To distinguish between echoes of radio frequency or acoustic signals in a building environment, the processor 14 identifies the first to arrive signals. For example, the processor 14 is configured for performing distance determination functions. A receiver is monitored. A first signal having a sufficient signal strength is selected as the signal of interest. Echoes have a longer distance to travel, so are later arriving. Coding or other techniques may be used to indicate a signal of interest as compared to noise or other signals. Alternatively, an amplitude threshold is used to indicate a signal of interest as compared to noise. For more accurate time-of-flight determination, a characteristic of the received signal is analyzed to identify a time at which a portion of the signal was received. A first, second or other zero crossing is identified in one embodiment for higher resolution timing. Zero crossing information may be interpolated from samples associated with a zero crossing. Each receive signal in a two-way response system is identified using a same portion or different portions of the signal, such as a same zero crossing.

The signal is sampled to identify information to the desired accuracy. A 12 GHz sampling may resolve radio frequency information to an inch, a 6 GHz sampling frequency may resolve information to two inches, a 1 GHz sampling frequency may resolve information to one foot, and a 500 MHz sampling frequency may resolve information to two feet. Other relative frequencies and associated resolutions may be provided. Sound travels at approximately 1.1 feet per millisecond, so may be sampled at a lesser frequency while still providing high accuracy at an inch, foot or yard level.

For two-way response, the processor 14 is operable to insert a time delay. For example, the processor 14 is part of a device 10 that responds to a transmitted signal with an additional transmitted signal. The processor 14 identifies a particular portion of the signal or a general time when the signal is received. The processor 14 then delays a set time period, such a time period associated with providing a sufficient time for the processor 14 and the device 10 to react, before generating a transmit signal in response. The set time delay may be preprogrammed, such as programmed during manufacture, programmed after installation through wireless radio frequency control signals or manually configured. The processor 14 associated with determining the distance determines the distance as a function of the time-of-flight and the set time delay. The set time delay is communicated or previously programmed into the processor 14. The set time delay is subtracted from the roundtrip time calculated by the processor 14. The roundtrip time is then divided by two and multiplied by the speed of sound and/or light depending on the type of signal. The result provides a distance.

Alternative distance determinations may be provided, such as determining distance based on one-way transmission or time-of-flight between transmission and reception. The transmitted signal may include coding information indicating a time of transmission. The received signal may then be used to determine time-of-flight. Where synchronization between devices is unavailable, a two-way distance determination may avoid inaccuracies due to unsynchronized clocks. Alternatively, synchronization is provided allowing one-way or two-way determination of distance. The synchronization is provided over a common clock or heartbeat signal provided wirelessly or through a wired connection to the device 10.

To minimize the effects of interference, both acoustic and radio frequency distance determinations may be performed at same or different times. Other mechanisms to minimize the effects of noise may be provided, such only accepting distances less than a certain value, such as 10 meters or other value associated with a likely relationship between two devices 10. The threshold may vary as a function of the type of device 10.

FIG. 2 shows a network of devices 10 for operating with one or more controllers 22 within a building 24. The plurality of devices 10 are spaced apart throughout the building 24, such as one or more devices 10 being put in each of or a number of rooms within the building 24. Different spacings may be provided. While one controller 22 is shown, a plurality of controllers 22 may be provided in other embodiments. Additional, different or fewer devices 10 and controllers 22 may be provided. Different distributions of the devices 10 may be provided. While shown as a single floor of a building 24, the network of devices 10 and controllers 22 may be distributed over multiple floors, a portion of the floor, a single room, a house or other building 24. In one embodiment, the network of devices 10 and controllers 22 is a network for wireless building automation or control, such as disclosed in U.S. Pat. No. 11/650,031 Other wireless or wired networks may be provided in alternative embodiments.

The various devices 10 are of a same configuration or different configuration than each other. For example, some of the devices 10 correspond to sensor arrangements while other devices 10 correspond to actuator arrangements. The same or different communications devices, such as the transceiver 16 or the acoustic transceiver 18, 20, are provided for each of the devices 10. Alternatively, different communications mechanisms and/or protocols are provided for different groups of the devices 10. The devices 10 may operate in an integrated manner for implementing one or multiple types of building automation control. Alternatively, different networks are provided for different types of building automation, such as security, HVAC and fire systems.

The controller 22 is the device 10 without a sensor or actuator 12. Alternatively, the controller 22 includes the sensor or actuator 12. The controller 22 is operable to wirelessly communicate with a plurality of spaced apart building automation devices 10. For example, acoustic or radio frequency communications are provided. Distances between any given device 22 and another device may be determined without information or control from the controller 22. Alternatively, the controller 22 triggers, controls or alters the distance determination between two given devices 10. In other embodiments, the distance associated with the device 10 is performed relative to the controller 22, such as where the position of the controller 22 is known.

In one example embodiment of the controller 22 controlling determination of the distance, the controller 22 is operable to cause one of the devices to transmit a test ranging signal. Information is received from other adjacent devices indicating reception or lack of reception of sufficient signal strength. The power of subsequent ranging signals from a given device 10 may be increased and/or devices operable to receive the test ranging signal of sufficient strength are assigned to interact with the device 10 for determining the distance from various locations. The distances from the device 10 acting as a source of the test signal to each of the assigned devices 10 is then determined. The devices 10 may be ordered to take turns or act sequentially to determine a plurality of distances associated with each device. Given the various possible structures and sources of interference within a building 24, the network control of the distance determination functions may more likely result in accurate distance measurements rather than distances based on echo information. Alternatively, one or more distances is based on echo information but is sufficiently accurate. Other control schemes or mechanisms may be provided.

Spread spectrum or code phasing may be used for range determination in other embodiments. For example, spread spectrum gold code is transmitted. The received signal is then correlated with a replica code generated at the receiver to determine a code phase offset indicating a distance. Other location or range determining signal structures may be used.

Where the device 10 is malfunctioning or in response to a determined alarm, the speaker 18 generates acoustic information in an audible frequency. For example, a chirp is sounded to allow maintenance personnel to more easily find a malfunctioning device. As another example, an alarm signal is sounded with the speaker 18 in response to a detected security or safety situation. The device 10 is operable to implement the generation of audible sound without information from other devices 10 or the controller 22. Alternatively, the speaker 18 is activated in response to control signals from the controller 22 or information from another device 10. Similarly, the microphone 20 may be used for other functions than range determination. For example, a microphone 20 is used for communication with building security personnel.

FIG. 3 shows one embodiment of a method for determining a distance for a building automation device. The method is implemented using the devices 10 shown in FIG. 1, the network of devices 10 and controllers 22 shown in FIG. 2 or different devices or networks. Different, additional or fewer acts may be provided than shown in FIG. 3. For example, acts 44, 46 and 48 are performed without the previous acts. As another example, acts 38 through 48 are performed without the previous acts. As another example, the acts shown in FIG. 3 are performed without act 42. Different coordination acts 32 through 36 may be provided.

In act 30, distance determination is coordinated. Coordination is performed using wired or wireless transmissions. For example, wireless radio frequency transmissions and receptions between various components within a network or between any two components for determining a distance is performed. As represented in act 32, a network of devices including a building automation device within a building is configured for the distance determination. Radio frequency signals control one or more devices to operate in a distance determination mode. Alternatively, the type of distance determination received signal triggers operation for distance determination. In act 34, a test signal for determining distance is generated. The test signal is generated from a particular device, but may be transmitted from a plurality of devices in other embodiments. For example, an acoustic test signal is generated from one device within a network of devices in response to control signals from a radio frequency transmission. In act 36, other devices within the network are poled to determine which devices adequately received the test signal. A group of building automation devices is then assigned to determine respective distances between the source of the test signal and each of the devices within the group in act 36. By using a test signal and assigning certain devices for reception of information from the test signals, devices associated with reception only through a long time-of-flight associated with one or more echoes, devices spaced too far from a device to give reliable information or devices separated by interfering structures, such as walls, may be eliminated from the distance determination associated with a given device to avoid erroneous information due to the building environment. In alternative embodiments, a test signal is not transmitted. In yet other embodiments, a plurality of test signals are transmitted with the same or different signal strength or other characteristics. Use of test signals or other signals and sufficient reception by various devices may provide distance information without further measurement of an actual distance. For example, reception of a test signal with certain amount of signal strength may indicate proximity of the source of the signal as being within a same room as the receiving device.

After any configuration or coordination between devices within a network, a distance determination is performed. Where a given device has more than one other device assigned for distance determination, two or more distances are determined from the two or more other devices. The different distances may be generated in response to a same initial or source transmission or different transmissions. For example, a sequential assignment or time slots are assigned for each of the different distances and corresponding devices, or coding is used to identify one signal as being for a particular device rather than other devices.

In act 38, a signal is wirelessly transmitted from a building automation device within a building. For example, a radio frequency or acoustic signal is transmitted. For an acoustic signal, an ultrasound signal is transmitted. Alternatively, an audible signal is transmitted. Both acoustic and radio frequency signals may be transmitted at a same or different times for use in determining distance. Transmitted signal includes coding or other information, such as indicating a time of transmission. Alternatively, the signal is free of additional coding. In one embodiment, the signal is a sinusoidal, bipolar or other signal type.

In act 40, the transmitted signal is received. For example, an acoustic or radio frequency signal is received. The reception occurs within the building, such as by a building automation device or other device. The desired signal is distinguished by other signals, such as echoes or noise by a strength of the signal or a timing of the signal. For example, a first to be received or first to arrive signal with sufficient signal strength is identified as a signal of interest or the signal least likely to be associated with noise or an undesirable number of echoes. Subsequent signals within a given time period are rejected. Alternatively, subsequent signals within the time period are accepted and used to indicate or identify possible structures or other sources of interference.

Where one-way distance determination is performed, the time-of-flight from the transmission of the signal to the reception of the signal is used with the rate of propagation of the signal to determine a distance. The clocks of the transmission device and the reception device are synchronized to provide accurate relative timing. Alternatively, the clocks are unsynchronized but have sufficiently accurate time stamp capabilities to determine the distance within a sufficiently desired range of accuracy, such as within inches, feet or meters. By accounting for any drift from a master clock, the distance may be determined.

To avoid synchronization issues, a two-way distance determination communication is provided. Alternatively, two-way distance determination communication is provided even with synchronized devices. In act 42, the building automation device or other device receiving an originally transmitted signal inserts a set time delay between the reception of a signal and subsequent transmission of another signal. The set time delay is inserted by delaying transmission of a subsequent signal by a program or predetermined amount of time after reception of the original signal. For increased accuracy, a portion of the receive signal is identified, such as a first zero crossing. The inserted time period begins based on the reception of the identified portion and ends by transmission of a signal or a transmission of a specific portion of the signal, such as a first zero crossing.

In act 44, a responsive signal is transmitted after insertion of the delay. The responsive transmitted signal has a same or different format at the original signal transmitted in act 38. Additional, different or no coding may be provided. The same or different communications medium, such as acoustic versus radio frequency, is used for the subsequent transmission.

In act 48, the subsequently transmitted signal is received by the originating device. The reception is performed similar or differently than the act 40.

The distance of interest is between two different devices. The source device performing acts 38 and 46, the remote device performing acts 40 and 44 or a different, remote device receives the timing information and determines the distance. From the perspective of the source device, a transmission is the initial step followed by reception of a responsive signal. From the perspective of the responsive or intermediate device, reception of the signal in act 40 is the initial step and proceeds through to transmission of the responsive signal in act 44.

In one embodiment, the transmission and reception of signals are performed in a well distributed manner, such as from point sources. Alternatively, directional transmission or reception may be provided. For example, an omni directional signal is generated. The reception is performed with an array, allowing identification of a direction of the omni directional transmission by differences in time-of-flight to each element of the array. Subsequent transmission is focused along a beam or in a general direction back towards the source. For any subsequent distance measurements, the original source may transmit and receive in a given direction based on information provided about the direction of the responsive or intermediate device.

In act 48, the distance associated with the building automation device is determined. The distance is determined as a function of the time-of-flight for one or more signals, the set time delay or combinations thereof. The time-of-flight information is determined by subtracting a time of transmission from a time of reception. Alternatively, the time of reception determines the time-of-flight where the time of transmission is assigned as a zero time. Any portion of the transmitted signal may be used for identifying the time-of-flight, such as determining a time of propagation of the signal from a first zero crossing after the first half cycle to reception of the first zero crossing. Where a delay time is inserted, the processor is provided with the set delay time as part of the signal, as part of the communication in parallel to or in a different path than the signal or as previously programmed and set for various devices. The inserted time period is subtracted from the two way time-of-flight time to identify an actual time-of-flight to and from a device.

In an embodiment determining the time-of-flight using acoustic information, the distance is determined from a speaker to a microphone as a function of one or more acoustic signals. For a two way response, the distance is determined as a function of time-of-flight for two acoustic signals. A second acoustic signal is transmitted from a different speaker co-located with a microphone. In response to a first signal being received at the microphone, the second signal is transmitted from a speaker after a set time delay. The second acoustic signal is then received at a microphone co-located with the speaker of the source or original signal. The time from transmission of the source signal to reception of the responsive signal minus a set time delay indicates a two way time-of-flight. By multiplying the value by the speed of sound and dividing by two, a distance is provided between the two devices. For a frequency embodiment, a similar process is performed.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A building automation device for determining distance after placement within a building, the building automation device comprising:

a sensor or an actuator operable for control of an environment of the building;

an acoustic transceiver; and a radio frequency transceiver; and a processor operable to control the acoustic transceiver for distance determination operation in response to control signals from the radio frequency transceiver, the processor operable to process data of the sensor or actuator.

2. The building automation device of claim 1 wherein the processor is operable to cause the acoustic transceiver to transmit a first ultrasound signal and is operable to determine a distance from the building automation device to another device as a function of a received second ultrasound signal.

3. The building automation device of claim 2 wherein the processor is operable to cause the radio frequency transceiver to transmit the distance and the data of the sensor or actuator.

* * * * *